United States Patent [19]

Johnson

[11] Patent Number: 4,807,261

[45] Date of Patent: Feb. 21, 1989

[54] AUTOMATIC CHANNEL POLARITY DETECTION AND CORRECTION ARRANGEMENT AND METHOD

[75] Inventor: Mark J. Johnson, Algonquin, Ill.

[73] Assignee: Motorola, Inc., Schaumburg, Ill.

[21] Appl. No.: 112,151

[22] Filed: Oct. 26, 1987

[51] Int. Cl.[4] .............................................. H04L 7/00
[52] U.S. Cl. ...................................... 375/114; 375/84
[58] Field of Search ................... 375/114, 116, 45, 46, 375/49, 62, 88; 331/1 A

[56] References Cited

U.S. PATENT DOCUMENTS

| | | | |
|---|---|---|---|
| 3,921,103 | 11/1975 | Burger | 375/46 X |
| 4,263,673 | 4/1981 | Bingham et al. | 375/112 |
| 4,409,562 | 10/1983 | Kurihara | 331/1 A |

Primary Examiner—A. D. Pellinen
Assistant Examiner—Derek S. Jennings
Attorney, Agent, or Firm—Robert J. Crawford

[57] ABSTRACT

A circuit arrangement automatically detects and corrects received data in an FSK signalling scheme wherein FSK data symbols are represented by a grey code-like numbering system and a predetermined word sync pattern leads each data transmission. The arrangement includes a memory (226) for prestoring data representative of the word sync pattern, a comparator (224) for comparing the prestored word sync pattern with the received data, an error detection circuit (228-252) for determining if the grey code-like numbering system has been transposed, and an error correcting circuit (220) for automatically correcting the transposition in the data.

20 Claims, 1 Drawing Sheet

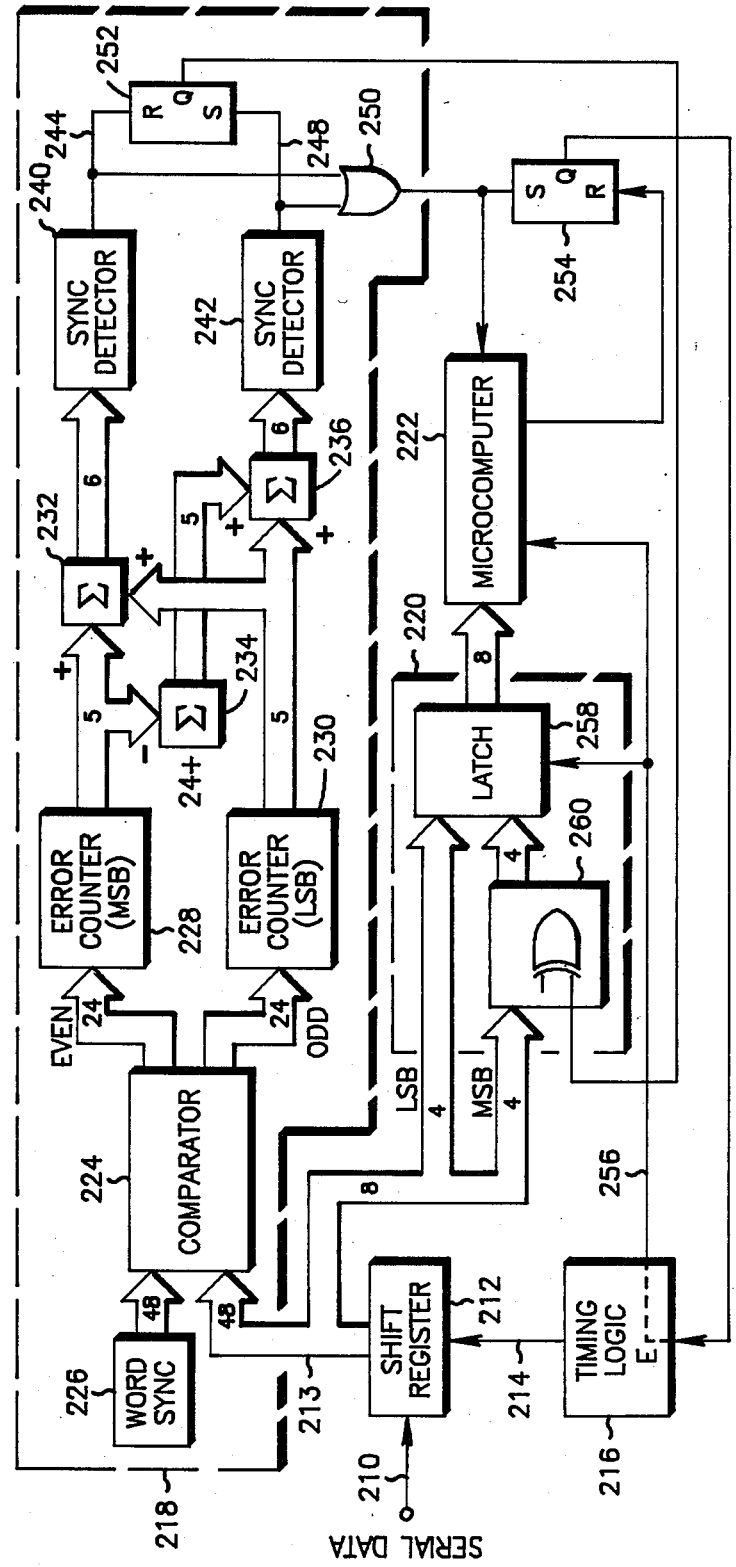
FIG. 1A   FIG. 2   FIG. 1B

AUTOMATIC CHANNEL POLARITY DETECTION AND CORRECTION ARRANGEMENT AND METHOD

FIELD OF THE INVENTION

The present invention relates generally to radio frequency (RF) data communication, and, more particularly, to polarity detection and control for data transmitted and received in RF communication systems.

BACKGROUND

RF data communication systems using baseband frequency shift keying (FSK) often employ a frequency on either side of the center frequency to represent data symbols. Each frequency is associated with a unique symbol. The symbols are represented as either a "1" or "0", and the designation of each symbol to either side of the center frequency is referred to as the channel polarity. Data communication is accomplished in such a system by transmitting frequencies in the FSK format and then decoding the symbol represented by each frequency. Unfortunately, such decoding is often unsuccessful due to channel polarity inversions.

Channel polarity inversions occur primarily as a result of the particular radio design employed. The problem is especially common where several types of radios are used on the same system or where one type of radio is used on more than one system. The system transmitter may invert the channel polarity in the transmitter pre-processing or modulating stages, while another radio may or may not be designed to invert the channel polarity in its receiver circuitry. The reasons for inverting or for not inverting are commonly due to the modulation designs, the local oscillator (L.O.) side selected for injection, and the manner in which the analog processing circuitry is designed in the discriminator portion of the radio receiver. In any case, the receiving radio may receive inverted or noninverted data and may invert or not invert the received data depending on the particular radio design.

In the past, such inversions have been compensated for by programming each radio with inversion bits for each system the radio may operate on. The radio may then employ such information to determine whether or not to invert the data received from the associated system. Unfortunately, this technique, requiring a prior knowledge of the system characteristics, has caused a number of problems in the manufacturing and the field maintenance of the radios.

In manufacturing, this technique has been a problem because the inversion bits must first be programmed to test the radio, and once again to set up the radio for the system(s) it will operate on. Although the efforts required to effect such programming may be minimal, it is well recognized that human interface increases the potential for error. In situations where the inversion bits are programmed incorrectly, the radio is inoperable until serviced and programmed correctly.

In field maintenance, a similar problem results. Not only must the technician servicing the radio be knowledgable about the programming requisites for the radio to repair it, but knowledge of the programming requisites for each system must also be available in order to correctly (re)set the inversion bits. The maintenance and distribution of such information is extremely burdensome.

Accordingly, a radio design is needed which can overcome the foregoing deficiencies.

OBJECTS OF THE PRESENT INVENTION

It is a general object of the present invention to provide a radio design which overcomes the above discussed shortcomings. More particularly, it is an object of the present invention to provide a receiver circuit which can automatically detect and correct channel polarity inversions in a FSK communication system employing grey code symbol assignments.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, and wherein:

FIGS. 1a and 1b comprise frequency spectrum graphs of a FSK symbol designation, according to the present invention; and FIG. 2 a block diagram of an automatic polarity detection and correction circuit, according to the present invention.

DETAILED DESCRIPTION OF THE PREFERRED EMBODIMENT

The arrangement disclosed in this specification has particular use for receiving data in a RF communication system using FSK signalling wherein the frequencies used in the FSK signalling are represented by a grey code-like numbering scheme, i.e. one bit of the code changes for each increase or decrease in the coding counting sequence FIG. 1a illustrates a four level (corresponding to 2 digits) grey code frequency assignment for a FSK signalling scheme according to the present invention. The grey code frequency assignments are centered about a center frequency (c.f.) 110 and include 00 representing the first frequency ($f_0$) 112, 01 representing the second frequency ($f_1$) 114, 11 representing the third frequency ($f_2$) 116 and 10 representing the fourth frequency ($f_2$) 118. This data is transmitted via RF waves serially. For example, the hexadecimal data 2B75 is communicated by transmitting the following frequencies in the following order:

$f_0$ $f_3$ (0010 representing hexadecimal 2)
$f_3$ $f_2$ (1011 representing hexadecimal B)
$f_1$ $f_2$ (0111 representing hexadecimal 7) and
$f_1$ $f_1$ (0101 representing hexadecimal 5).

An inversion of the above channel polarity results in the 00s being transposed with the 10s and the 01s being transposed with the 11s. Such a transposition is illustrated in FIG. 1b where 10 is now designated at the first frequency 112, 11 is designated at the second frequency 114, etc. As a result of this inversion, the receiver would have to reverse this transposition before the received data could be utilized. As previously discussed, known techniques for such correction have been burdensome.

The arrangement of the present invention recognizes that in such a grey code counting sequence where the numbers are assigned about a center frequency (eg. FIG. 1a), channel inversion will result in only one bit of each grey code symbol being inverted. FIG. 1b is illustrative. The 00s being transposed with the 10s and the 01s being transposed with the 11s results in the most significant bit (MSB) of the symbol being inverted, while the least significant bit (LSB) of the symbol remains unchanged in each transposition. For any typical N-bit grey code counting sequence, only the MSB will invert while the other bits will remain unchanged. In any case, the arrangement disclosed herein establishes the bit which will invert, and detects such inversion.

FIG. 2 illustrates such an arrangement which not only detects when a change in the MSB occurs, but also automatically corrects the change. The arrangement is best utilized in an RF radio receiver at the output of the receiver's data discriminator circuitry wherein the data is provided in binary serial form with a forty eight bit word synchronization (sync) pattern leading each transmission of data, and wherein the symbols representing the FSK signalling scheme are as shown in FIG. 1a. It should be understood that the arrangement may readily be modified to accommodate a word sync pattern of any length and/or a signalling scheme having more than the four levels of symbols shown in FIG. 1.

In FIG. 2, the arrangement is illustrated receiving serial data 210. The serial data 210 is clocked into a 48 bit shift register 212 to convert the serial data 210 into parallel form (received data 213). The number "48" in the bus at the output of the register 212 indicates that forty-eight bits are output; this is consistent with all of FIG. 2. Once in parallel form, a sync detection circuit 218 is employed to detect the presence of the word sync pattern leading each transmission of serial data 210. The sync detection circuit 218 detects the presence of the word sync pattern whether the channel polarity has or has not been inverted. However, if the channel polarity has been inverted, a correction circuit 220 is used to correct the polarity before a microcomputer (u-C) 222 interprets the received data 213.

The serial data 210 is continuously clocked into the register 212 via a clock signal 214 generated by a timing logic circuit 216. The timing logic circuit 216 may be implemented using an oscillator and divider circuit.

The sync detection circuit 218 accomplishes its detection function by asynchronously analyzing the received data 213 provided in parallel form by the register 212. The received data 213 is received by a comparator 224 along with a forty eight bit word sync pattern, representing the expected pattern leading each transmission of serial data 210, prestored in a memory 226. The comparator 224 asynchronously compares the received data 213 with the expected word sync pattern from memory 226 and provides an indication at its output for each pair of compared bits that match. Once the word sync pattern matches each bit of the received data 213, the comparator 224 will provide forty eight outputs, each indicating a match.

The forty eight outputs of the comparator 224 are coupled to two identical error counter circuits 228 and 230 which effectively count the errors in the LSB and the MSB, respectively, of the grey code numbers. As previously discussed, the MSB of the grey code symbol will invert if the channel polarity is inverted. Detection of the MSB is accomplished by coupling every other bit of the forty eight bits provided by the comparator 224 to the counters 228 and 230. The counter 228 receives the even bits, representing the MSBs, while the counter 230 receives the odd bits, representing the LSBs. In response to the counters 228 and 230 receiving bit information indicative of the number of word sync bit errors in the MSB and LSB of each grey code symbol, the counters 228 and 230 each provide a binary number representative of the number of errors received at their respective inputs (eg., 10001 represents 17 errors).

The error counters 228 and 230 may be implemented asynchronously by cascading full adder modules in the conventional manner such that the inputs to each counter are added together to provide the representative binary output at each the counter's output.

The error counts provided by the counters 228 and 230 are employed by adders 232, 234 and 236 to provide the overall word sync pattern error count for the received data 213. The adder 232 provides the overall error count presuming the channel polarity was not inverted, while the adder 236 provides the overall error count presuming the channel polarity was inverted.

The non-inverted channel polarity error count is generated by summing the errors counted for the LSBs, provided by the error counter 230, with the errors counted for the MSBs, provided by the error counter 228.

The inverted channel polarity error count is more complex. It may best be understood mathematically as follows:

$$E_{lsb}+(24-E_{msb}),$$

where $E_{msb}$ is the number of errors counted for the MSB of the received data 213, and where $E_{lsb}$ is the number of errors counted for the LSB of the received data 213.

This follows since, presuming the channel polarity was inverted, $(24-E_{msb})$ represents the number of word sync pattern errors that would have been detected had the channel polarity not been inverted. As an example, consider the case where the channel polarity was inverted and no other errors were introduced during transmission. The number of word sync pattern errors provided at the output of counter 228 would be twenty four, and the number of word sync pattern errors provided at the output of counter 230 would be zero. Thus, the above mathematical expression would represent zero overall word sync pattern errors.

The above mathematical expression is implemented in a two step summation. First, the adder 234 is employed to generate $(24-E_{msb})$. This is accomplished by subtracting the number at the output of the counter 228 from the fixed number 24. Second, the adder 236 is employed to add the output of adder 234 with the number at the output of the counter 230.

Accordingly, the output of the adder 232 provides the overall error count presuming that no inversion to the channel polarity has occurred, and the output of the adder 236 provides the overall error count while compensating for an inversion to the channel polarity, i.e., while presuming that a channel error has occurred.

Each of these overall error counts are provided to a pair of identical sync detectors 240 and 242. Each sync detector 240 or 242 includes a comparator for comparing the error count received at its input to a predetermined threshold count. If the error count received at its input is less than the threshold, the sync detector 240 or 242 provides an output signal 244 or 248 so indicating. Thus, if there was not a channel polarity inversion and the number of bit errors in the comparison between the word sync pattern and the received data was below the threshold, the sync detector 240 generates an output signal 244 to indicate that it has detected the expected word sync pattern in the received data 213. If there was a channel polarity inversion and the number of bit errors in the received data was below the threshold, the sync detector 242 generates an output signal 248 to indicate that it has detected the expected word sync pattern.

The outputs of the sync detection circuit 218 are provided by an OR gate 250 and a S/R latch 252, each of which is controlled by the output signals 244 and 248. The OR gate 250 combines both output signals 244 and 248 to indicate to the u-C 222 that the expected word sync pattern has been detected in the received data 213 and that the u-C 222 should begin receiving and interpreting the data that follows.

The output of the gate 250 is also coupled to the set input of an S/R latch 254. The latch 254 is set once the word sync pattern has been detected so that a second clock signal 256 from the timing logic 216 may be enabled. Once enabled, the clock signal 256 clocks a latch 258 (within the correction circuit 220) and notifies the u-C 222 when an additional 8 bits of data has been prepared for reception and interpretation by the u-C 222. The clock signal 256 is eight times slower than the clock signal 214 so that after the word sync pattern is detected, the u-C 222 is notified each time 8 bits are received from the shift register 212.

The S/R latch 254 is reset by the u-C 222 after the u-C 222 detects the end of the transmitted data.

The S/R latch 252 is used by the correction circuit 220 to indicate when the received data 213 should be corrected. This is accomplished by employing a quad 2-input EX-OR circuit 260 within the correction circuit 220 to invert the grey code's MSBs of the received data 213 when the sync detector 242 has detected a channel polarity inversion. To this end, the sync detector 242 sets the latch 252, and the latch 252 provides an output which is received by one input of each of the four EX-OR gates in the circuit 260. The other input of each of the four EX-OR gates in the circuit 260 respectively receives the even bits, corresponding to the MSBs of the grey code, of the received data 213. After passing through the circuit 260, the MSBs of the received data 213 are latched by the latch 258 and synchronously clocked with their associated LSBs to the u-C 222.

Once the latch 252 is set by the sync detector 242, it remains set until the sync detector 240 resets it upon detection of the word sync pattern without an inverted channel polarity.

It will be understood by those skilled in the art that various other modifications and changes may be made to the present invention without departing from the spirit and scope thereof.

What is claimed is:

1. A method for decoding data received in a receiver wherein the data is coded in symbols which are represented by a grey code-like numbering system and the data includes a predetermined word sync pattern, the method comprising the steps of:
   prestoring data representative of the predetermined word sync pattern;
   comparing the prestored data with the received data to determine if the predetermined word sync pattern is represented in the received data;
   in response to the comparison, determining if the grey code-like numbering system has been transposed in the data; and
   responsive to the grey code-like numbering system being transposed, automatically correcting the transposition in the data.

2. A method for decoding data, according to claim 1, wherein the step of comparing includes the steps of:
   identifying a bit, common to each symbol, which will invert if the grey code-like numbering system is transposed in the data, and
   counting bit errors associated with the identified common bit.

3. A method for decoding data, according to claim 2, wherein the step of comparing includes the step of counting overall bit errors associated with the received data presuming the grey code-like numbering system is transposed in the data.

4. A method for decoding data, according to claim 2, wherein the step of comparing includes the step of counting overall bit errors associated with the received data presuming the grey code-like numbering system is not transposed in the data.

5. A method for decoding data, according to claim 2, wherein the step of automatically correcting includes the step of inverting the identified common bit in the data.

6. An arrangement for decoding data received in a receiver wherein the data is coded in symbols which are represented by a grey code-like numbering system and the data includes a predetermined word sync pattern, the arrangement comprising:
   means for prestoring data representative of the predetermined word sync pattern;
   means for comparing the prestored data with the received data to determine if the predetermined word sync pattern is represented in the received data;
   means, responsive to the means for comparing, for determining if the grey code-like numbering system has been transposed in the data; and
   means, responsive to the means for determining, for automatically correcting the transposition in the data.

7. An arrangement for decoding data, according to claim 6, wherein means for comparing includes means for identifying a bit, common to each symbol, which will invert if the grey code-like numbering system is transposed in the data and means for counting bit errors associated with the identified common bit.

8. An arrangement for decoding data, according to claim 7, wherein means for comparing includes means for counting overall bit errors associated with the received data presuming the grey code-like numbering system is transposed in the data.

9. An arrangement for decoding data, according to claim 7, wherein means for comparing includes means for counting overall bit errors associated with the received data presuming the grey code-like numbering system is not transposed in the data.

10. An arrangement for decoding data, according to claim 7, wherein means for automatically correcting includes means for inverting the identified common bit in the data.

11. A method for decoding data received in an FSK signalling receiver wherein the data is coded in FSK symbols which are represented by a grey code-like numbering system and the data includes a predetermined word sync pattern, comprising the steps of:
   prestoring data representative of the predetermined word sync pattern;
   identifying a common bit of each symbol that will invert if the grey code-like numbering system is transposed in the data;

comparing the prestored data with the received data to determine if the grey code-like numbering system has been transposed in the data;

responsive to the grey code-like numbering system being transposed, automatically inverting the identified common bit so as to correct the transposition in the data.

12. A method for decoding data, according to claim 11, wherein the step of comparing includes the step of counting overall bit errors as a result of the comparison while compensating for a transposition in the data.

13. A method for decoding data, according to claim 12, wherein the step of comparing includes the step of comparing the overall bit errors to a predetermined bit error threshold.

14. An arrangement for decoding data received in an FSK signalling receiver wherein the data is coded in FSK symbols which are represented by a grey code-like numbering system and the data includes a predetermined word sync pattern, comprising:

means for prestoring data representative of the predetermined word sync pattern;

means for identifying a common bit of each symbol that will invert if the grey code-like numbering system is transposed in the data;

means for comparing the prestored data with the received data to determine if the grey code-like numbering system has been transposed in the data;

means, responsive to the grey code-like numbering system being transposed, for automatically inverting the identified common bit so as to correct the transposition in the data.

15. An arrangement for decoding data, according to claim 14, wherein means for comparing includes means for counting overall bit errors as a result of the comparison while compensating for a transposition in the data.

16. An arrangement for decoding data, according to claim 15, wherein means for comparing includes means for comparing the overall bit errors to a predetermined bit error threshold.

17. A method for decoding FSK data received in a RF radio receiver wherein the data is coded in FSK symbols which are represented by a grey code-like numbering system and the data includes a predetermined word sync pattern, comprising the steps of:

prestoring data representative of the predetermined word sync pattern;

identifying a common bit of each symbol that will invert if the grey code-like numbering system is transposed in the data;

comparing the prestored data with the received data to determine if the predetermined word sync pattern is represented in the received data;

responsive to the step of comparing, counting the errors from the word sync pattern comparison, while compensating for a transposition in the grey code-like number system, to determine if the grey code-like numbering system has been transposed in the data;

responsive to the step of comparing, counting the errors from the word sync pattern comparison without compensating for a transposition in the grey code-like number system;

responsive to at least one of the error counting steps, determining if the grey code-like numbering system has been transposed in the data, responsive to the determination that the grey code-like numbering system has been transposed, automatically inverting the identified common bit so as to correct the transposition in the data.

18. A method for decoding FSK data, according to claim 17, wherein the step of determining includes the step of comparing counted errors to a predetermined bit error threshold.

19. An arrangement for decoding FSK data received in a RF radio receiver wherein the data is coded in FSK symbols which are represented by a grey code-like numbering system and the data includes a predetermined word sync pattern, comprising:

means for prestoring data representative of the word sync pattern;

means for identifying a common bit of each symbol that will invert if the grey code-like numbering system is transposed in the data;

means for comparing the prestored data with the received data to determine if the predetermined word sync pattern is represented in the received data;

means, responsive to the means for comparing, for counting the errors from the word sync pattern comparison, while compensating for a transposition in the grey code-like number system, to determine if the grey code-like numbering system has been transposed in the data;

means, responsive to the means for comparing, for counting the errors from the word sync pattern comparison without compensating for a transposition in the grey code-like number system;

means, responsive to at least one of the error counting steps, for determining if the grey code-like numbering system has been transposed in the data, means, responsive to the determination that the grey code-like numbering system has been transposed, for automatically inverting the identified common bit so as to correct the transposition in the data.

20. An arrangement for decoding FSK data, according to claim 19, wherein means for determining includes means for comparing counted errors to a predetermined bit error threshold.

* * * * *